United States Patent [19]

Kelso et al.

[11] Patent Number: 5,219,800

[45] Date of Patent: Jun. 15, 1993

[54] COLORED CERAMICS FOR ELECTRONIC PACKAGES

[75] Inventors: John F. Kelso, Apollo; Karen L. Bowersox, Ford City; G. Edward Graddy, Jr.; Douglas A. Weirauch, Jr., both of Murrysville, all of Pa.

[73] Assignee: Aluminum Company of America, Pittsburgh, Pa.

[21] Appl. No.: 732,230

[22] Filed: Jul. 18, 1991

[51] Int. Cl.$^5$ .............................................. C03C 14/00
[52] U.S. Cl. ...................................... 501/32; 501/17; 501/128
[58] Field of Search ................ 501/32, 127, 17, 128

[56] References Cited

U.S. PATENT DOCUMENTS

| | | | |
|---|---|---|---|
| 3,791,833 | 2/1974 | Sugiura et al. | 106/46 |
| 4,160,673 | 7/1979 | Fujita et al. | 501/155 X |
| 4,481,261 | 11/1984 | Johnson et al. | 428/434 |
| 4,769,294 | 9/1988 | Barringer et al. | 428/702 |
| 4,818,731 | 4/1989 | Mizutani et al. | 501/17 |
| 5,010,041 | 4/1991 | Koyama | 501/4 |
| 5,010,042 | 4/1991 | Kandachi | 501/32 |
| 5,039,629 | 8/1991 | Kakligian | 501/32 |

FOREIGN PATENT DOCUMENTS

| | | |
|---|---|---|
| 53-137216 | 11/1978 | Japan . |
| 63-182252 | 7/1988 | Japan . |
| 63-182253 | 7/1988 | Japan . |
| 1-282147 | 11/1989 | Japan . |
| 1571035 | 6/1990 | U.S.S.R. . |

*Primary Examiner*—Mark L. Bell
*Assistant Examiner*—Chris Gallo
*Attorney, Agent, or Firm*—David W. Pearce-Smith

[57] ABSTRACT

A process for increasing the colorizing effect of known colorizing oxides in an alumina body. The process includes the steps of (a) forming a glass frit containing colorants; (b) mixing the frit and alumina to form a green mixture; and (c) firing the mixture to form a fired ceramic body.

15 Claims, No Drawings

COLORED CERAMICS FOR ELECTRONIC PACKAGES

FIELD OF THE INVENTION

The present invention relates to colorizing agents and the use of colorants in the manufacture of electronic components. More particularly, the present invention relates to frits containing $Cr_2O_3$, $MoO_3$ and/or $WO_3$ for obtaining colored ceramic bodies.

BACKGROUND ART

Ceramic materials are used in various electronic parts such as semi-conductor IC packages, transistor headers, etc. They require good electrical insulation characteristic and reasonable mechanical strength and thermal conductivity.

Conventionally, alumina ($Al_2O_3$) is used as a dielectric material for microelectronic packages. It has excellent electrical (insulating) and mechanical (especially strength), and thermal properties.

In some applications of the ceramic material, it is further required that it should also have a high degree of heat emissivity so that a large amount of heat may not be stored in the ceramic body, and that the ceramic body should be opaque so that no light is transmitted therethrough. To meet the requirements, it is common practice to color the ceramic body to black or near-black, i.e. purple, by adding suitable metals and/or metal oxides as coloring agents.

U.S. Pat. No. 3,791,833 issued to Sugiura et al discloses a ceramic composition for use in electronic equipment comprising at least one of $Al_2O_3$ and BeO as a basic component, 0.1 to 5 percent by weight CoO and a further additive chosen from the group consisting of $MnO_2$, $Cr_2O_3$, $V_2O_5$, $Fe_2O_3$ and mixtures thereof.

U.S. Pat. No. 4,818,731 issued to Mizutani et al discloses a colored frit and method for manufacturing of artificial stone. The colored frit is prepared by heating a material composition comprising a devitrifying substance, a coloring agent and glass. The devitrifying substance is fluoride in an amount of 0.5 to 20 wt.%.

U.S. Pat. No. 4,481,261 issued to Johnson et al discloses blister-resistant dielectric material for use with multilayer circuits. The dielectric is comprised of 10–25% of an oxide mixture of $Cr_2O_3$, $Co_2O_3$ and $Fe_2O_3$ which has been heated to about 1000° C. and it prevents the blistering.

U.S. Pat. No. 4,769,294 issued to Barringer et al discloses alumina material for low temperature cosintering with refractory metallization. Colorants such as MnO, $MoO_3$ or $TiO_2$ or a combination thereof are added in amounts up to approximately 2% by weight to opacify the fired ceramic.

Japanese Patents 63,182,252, and 63,182,253 disclose a black ceramic alumina body. The colorant used to obtain the black color includes $MoO_2$ and $Cr_2O_3$.

Japanese Patent 53,137,216 disclose a colored ceramic alumina body. The colorant used to obtain the reddish violet color includes $Cr_2O_3$ and metallic molybdedum and/or tungsten in an amount equal to or less than the chromium. The material is sintered in a nonoxidizing atmosphere.

The use of colorant has several serious drawbacks in the formation of alumina components. The first is that the cost of the colorants is relatively large as compared to the cost of the alumina body. It would be advantageous, therefore, to devise a method of coloring an alumina body to match a specified color and intensity using the least amount of costly colorants.

Colorants effect the properties of the fired alumina body. When colorants are added in an amount exceeding a predetermined maximum value, the electrical, mechanical and thermal characteristics inherent in alumina are deteriorated beyond the point of utility for a given application. The development of multilayer ceramic circuit boards for higher frequency, higher density and higher speed devices tends to decrease the maximum amount of colorants that can be added to the alumina body. At the same time if the amount of colorants does not reach a critical minimum level, the resulting color of the fired body will not match a specified color and intensity.

Accordingly, the primary object of the invention is to provide a colored ceramic body for use in various electronic parts, which has excellent electrical, mechanical and thermal characteristics, and in which the volume resistivity is not deteriorated when the ceramic body has been treated in a reducing atmosphere.

Another object of the invention is to obtain a purple colored alumina body using the least amount of coloring metals and metal oxides to obtain the desired intensity.

These and other objects and advantages of the present invention will be more fully understood and appreciated with reference to the following description.

SUMMARY OF THE INVENTION

In accordance with the present invention there is provided a process for increasing the colorizing effect of known colorizing oxides in an alumina body. The process includes the steps of (a) forming a glass frit containing colorants; (b) mixing the frit and alumina to form a green mixture; and (c) firing the mixture to form a fired ceramic body.

In a preferred embodiment of the invention, the colorants are $MoO_3$ or $WO_3$ and $Cr_2O_3$ and the resultant color is purple. It is contemplated that up to 10 wt.% of $MoO_3$, $WO_3$ and $Cr_2O_3$ can be used in practicing the present invention. A most preferred composition for the colored glass frit is 2–8 wt.% $MoO_3$; 0.2–5 wt.% $Cr_2O_3$; and 90–98 wt.% of a substantially colorless glass.

DESCRIPTION OF THE INVENTION

It has been discovered that the amount of coloring metals and metal oxides, which are needed to obtain a desired color intensity, can be reduced if the colorants are placed into a frit prior to incorporation into the final ceramic body. Placing the colorants in the frit allows for mixing of the elements at the atomic level and thus permits greater dispersion of the colorants in smaller sized particles. We believe that it is the improved dispersion of small particles in the frit that decreases the amount needed to obtain the desired colorizing effect.

The following examples are offered to illustrate the invention.

EXAMPLE 1

A ceramic body was prepared from a mixture of 310.4 grams $Al_2O_3$ (88.8 wt.%), 21.7 grams of a colorless frit (6.2 wt.%), 10.5 grams of $Cr_2O_3$ (3.0 wt.%) and 7.0 grams of $MoO_3$ (2.0 wt.%). The colorless frit was an alkaline earth alumino-silicate glass.

This mixture is charged into a ball mill where the materials are uniformly mixed in the presence of a suitable organic medium over the course of 20 hours. The blend is then cast on polymer and dried. The resulting green ceramic sheet is fired in a reducing atmosphere at approximately 1625° C. The color of the fired ceramic is measured and the CIE (Commission Internationale de l'Eclairage, 1931) relative color units are recorded in the following Table.

TABLE

| Example No. | Lightness (L*) | Redness (a*) | Blueness (b*) |
|---|---|---|---|
| 1 | 42.34 | 6.23 | −4.30 |
| 2 | 37.66 | 2.49 | −2.44 |
| 3 | 39.86 | 5.38 | −4.08 |

EXAMPLE 2

A fired ceramic having the following composition was prepared according to the procedures of Example 1. The ceramic was prepared from a mixture of 310.4 grams (88.8 wt.%) $Al_2O_3$ and 28.7 grams (8.2 wt.%) frit and 10.5 grams (3 wt.%) $Cr_2O_3$. The frit contained 8.2 wt.% $MoO_3$ (0.7 wt.% of the total mixture). The color of the resulting fired ceramic is measured and the relative color units are recorded in Table 1.

A comparison of the color units of the materials prepared in Examples 1 and 2 show that the darkness (shown as a lower lightness number) of the material of Example 2 was more intense than that of Example 1 despite the fact that the weight percent of the $MoO_3$ is approximately one-third that of Example 1. In addition, the redness (a*) and blueness (b*) of the fired ceramic material of Example 2 was less intense than the material of Example 1.

EXAMPLE 3

The procedure of Example 1 is repeated with a blend prepared from a mixture of 91 wt.% $Al_2O_3$, 1.7 wt.% colorless frit, 5.2 wt.% frit of the frit used in Example 2 and 2.0 wt.% $Cr_2O_3$. The color of the resulting fired ceramic was measured and the relative colorants are recorded in Table 1.

A comparison of the color units of the materials prepared in Examples 1 and 3 show that the darkness (shown as a lower lightness number) of the material of Example 3 was more intense than that of Example 1, despite the fact that the weight percent of the $MoO_3$ is approximately one-third that of Example 1. In addition, the redness (a*) and blueness (b*) of the fired ceramic material of Example 2 was less intense than the material of Example 1 but more intense than that of Example 2.

It is to be appreciated that the present invention is susceptible to a number of obvious modifications. For example, the invention is not limited to high alumina bodies. It may other uses in the fabrication of other ceramics such as glasses, silicon nitride, SiAlON, aluminum nitride, cordierite, titanium silicate, fosterite and mixtures thereof.

In addition, although the present invention has been described in terms of molybdenum oxide ($MoO_3$) and chromium trioxide ($Cr_2O_3$) colorants, other known colorants can be used in practicing the present invention. Examples of such coloring agents are enumerated below together with the colors they product.

Chromium ($CrO_2$): Pink, orange, yellowish green, green-blue, light brown, red purple;

Manganese ($MnO_2$): Yellowish brown, brown, black, blue purple, purple, gray, pink;

Iron ($Fe_2O_3$, $Fe_3O_4$): Red, light brown, brown, yellow, green, blue, black, olive;

Cobalt ($Co_2O_3$, $CoO$, $CoCl_2$): Yellow, green, blue, greenish purple, red purple;

Nickel ($Ni_2O_3$): Yellow, olive green, purple, red purple, gray;

Copper ($CuO$, $CuCO_3$): Red, green, blue green, turkish blue, purple, gray, black;

Molybdenum ($MoO$): Blue, black;

Tin ($SnO_2$): White;

Titania ($TiO_2$): White, beige, yellow, blue gray, black;

Antimony ($Sb_2O_3$): Yellow, yellow orange, blue-gray, white, black;

Varied colors of the same metal (metallic oxide) are obtained depending on the firing atmosphere, firing time-temperature profile or varied conditions of rapid or slow cooling of the oxide.

In addition the glass frit that is used is not critical to practicing the present invention. In general, a composition of a silicate glass is used. This is comprised of such constituents as $SiO_2$—$Al_2O_3$—$B_2O_3$—($MgO$, $CaO$, $Na_2O$, etc.). As occasion demands, constituents such as $P_2O_5$, $ZnO$, $BaO$, $Pbo$, $ZrO_2$, $TiO_2$, $Li_2O$, etc. may be added therein.

While the invention has been described in terms of preferred embodiments, it is intended that all matter contained in the above description shall be interpreted as being illustrative. The present invention is indicated by the broad general meaning of the terms in which the appended claims are expressed.

What is claimed is:

1. A process for increasing the colorizing effect of known colorant in an alumina body, said process comprising the steps of:
   (a) forming a glass frit containing at least about 0.2 wt.% of colorant;
   (b) mixing said frit and alumina to form a green mixture containing at least 80 wt.% alumina; and
   (c) firing said mixture in a reducing atmosphere to form a fired ceramic body.

2. The process of claim 1 in which step (a) comprises:
   forming a glass frit containing at least one colorant selected from the group of $Cr_2O_3$, $MoO_3$, $WO_3$, $Co_3O_4$, $V_2O_3$, $V_2O_5$, $CrO_3$, $Na_2CrO_4$, $MnO_2$, $Mn_2O_3$, $MnO$, $Mn_2O_7$, $Fe_2O_3$, $FeO$, $Fe_3O_4$, $Ni_2O_3$, $Cu_2O$ and $CuO$.

3. The process of claim 1 wherein said glass frit contains 0.2-10 wt.% $MoO_3$.

4. The process of claim 1 wherein siad glass frit contains 0.2-10 wt.% $Cr_2O_3$.

5. The process of claim 1 in which said step of mixing said frit and alumina comprises:
   mixing said frit, alumina and a second frit essentially free of colorants.

6. The process of claim 1 in which said step of mixing said frit and alumina comprises:
   mixing said frit, alumina and colorants.

7. The process of claim 1 in which step (c) further comprises:
   firing said mixture in a reducing atmosphere at a temperature greater than about 1500° C. to form a fired ceramic body.

8. A process for increasing the colorizing known colorant in an alumina body, said process comprising the steps of: (a) forming a glass frit containing at least one colorant selected from the group of $Cr_2O_3$, $MoO_3$, $WO_3$, $Co_3O_4$, $V_2O_3$, $V_2O_5$, $CrO_3$, $Na_2CrO_4$, $MnO_2$, $Mn_2O_3$, MnO, $Mn_2O_7$, $Fe_2O_3$, FeO, $Fe_3O_4$, $As_2O_5$, $Ni_2O_3$, $Cu_2O$ and CuO;
  (b) mixing said frit and alumina to form a green mixture; and
  (c) firing said mixture in a reducing atmosphere at a temperature greater than about 1500° C. to form a fired ceramic body.

9. A fired ceramic body consisting essentially of:
  (a) 80-96 wt.% $Al_2O_3$;
  (b) 5-10 wt.% frit comprising 0.2-10 wt.% $MoO_3$; and (c) 0.2-5 wt.% $Cr_2O_3$.

10. The fired ceramic body of claim 9 in which said frit comprises:
  (a) 2-8 wt.% $Mo_3$;
  (b) 0.2-4 wt.% $Cr_2O_3$; and
  (c) 90-98 wt.% of a substantially colorless glass.

11. The fired ceramic body of claim 9 which further comprises:
  (d) 0.2-5 wt.% of a substantially clear glass.

12. A process for increasing the colorizing effect of molybdenum metal in an alumina body, said process comprising the steps of:
  (a) forming a glass frit in an oxidizing atmosphere from a mixture containing at least about 0.2 wt.% molybdenum oxide;
  (b) mixing said frit and alumina to form a green mixture containing at least 80 wt.% alumina; and
  (c) firing said mixture to form a fired ceramic body, said firing is performed in a reducing atmosphere to reduce said molybdenum oxide to metallic molybdenum and thereby colorize said ceramic body.

13. The process of claim 12 in which step (a) includes: heating said mixture for a sufficient time to allow said molybdenum oxide to disperse within said glass.

14. The process of claim 12 which further includes: mixing said frit, at least 2.0 wt.% $Cr_2O_3$ and alumina to form a green mixture containing at least 80 wt.% alumina.

15. A process for producing a purple ceramic body, said process comprising the steps of:
  (a) forming a glass frit in an oxidizing atmosphere from a mixture containing at least about 0.2 wt.% molybdenum oxide;
  (b) mixing said frit, at least 2.0 wt.% $Cr_2O_3$ and alumina to form a green mixture containing at least 80 wt.% alumina; and
  (c) firing said mixture to form a fired ceramic body, said firing is performed in a reducing atmosphere to reduce said molybdenum oxide to metallic molybdenum and thereby colorize said ceramic body.

* * * * *

UNITED STATES PATENT AND TRADEMARK OFFICE
CERTIFICATE OF CORRECTION

PATENT NO. : 5,219,800
DATED : June 15, 1993
INVENTOR(S) : John F. Kelso et al

It is certified that error appears in the above-indentified patent and that said Letters Patent is hereby corrected as shown below:

Col. 4, line 64          After "colorizing", insert --effect of--.
Claim 8

Signed and Sealed this

Fifteenth Day of March, 1994

Attest:

BRUCE LEHMAN

*Attesting Officer*          *Commissioner of Patents and Trademarks*